Figure 1:
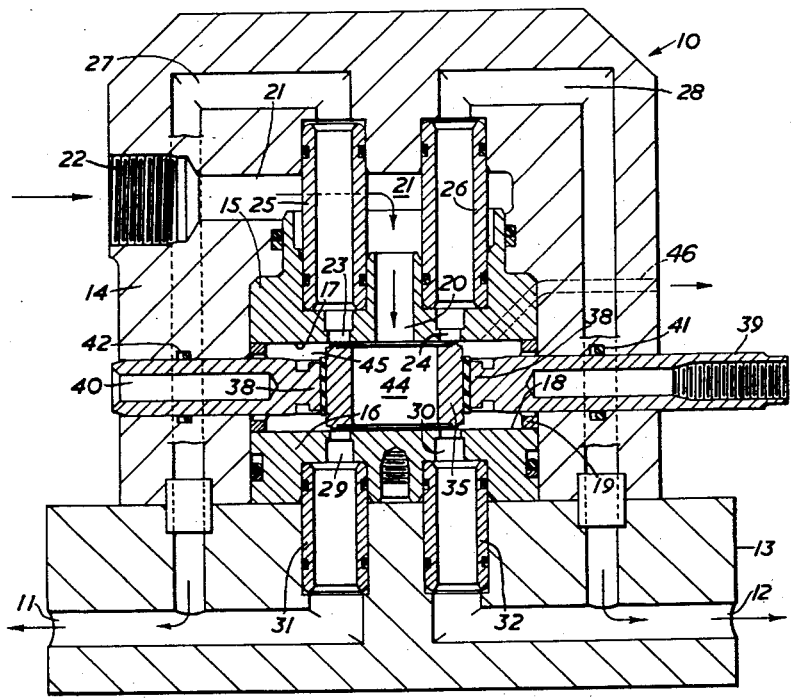

INVENTORS
HERBERT F. J. CALLAN
FRANK G. MATTOS

BY Watson, Cole, Grindle & Watson
ATTORNEYS

INVENTORS
HERBERT F. J. CALLAN
FRANK G. MATTOS

BY
Watson, Cole, Grindle & Watson
ATTORNEYS

United States Patent Office
2,989,985
Patented June 27, 1961

2,989,985
VALVE STRUCTURE FOR FACILITATING PASSAGE OF FOREIGN PARTICLES
Herbert F. J. Callan and Frank G. Mattos, Hayes, England, assignors to Fairey Aviation Limited, Hayes, England, a company of Great Britain
Filed Jan. 7, 1960, Ser. No. 979
Claims priority, application Great Britain Jan. 15, 1959
8 Claims. (Cl. 137—622)

This invention relates to hydraulic servo valves of the type having a movable valve member formed with bearing surfaces which co-operate with opposed ported bearing surfaces of the valve body to support the valve member slidably therein, and to provide the required clearances for hydraulic sealing between the high-pressure and low-pressure sides of the valve member, selection of the valve being performed by relative sliding movement of the valve member in the valve body.

In such valves in common with all other types of servo valves, it has now been discovered that problems arise due to the contamination of the hydraulic fluid with finely divided solid particles, particularly particles which are slightly larger in size than the normal width of the clearance gaps between the co-operating bearing surfaces of the movable valve member and the valve body. It will be realised that pressurised hydraulic fluid will seep steadily through the gaps between the opposed bearing surfaces in a thin film flowing from the high pressure region of the valve to the low pressure or return region. These pressurised fluid films will normally serve to lubricate the valve to ensure easy sliding requiring only a very small force to move the valve member relatively to the valve body. Each pressurised fluid film will suffer a pressure drop between its entry to and exit from the gap through which it flows, and the resulting pressure gradient may be assumed to be substantially linear along the direction of movement of the film and to be substantially independent of the thickness of the film over the range of clearance in question. Accordingly a resultant thrust will be imposed on the movable valve member by the pressure distribution over its bearing surface at each side of the member, which will tend to increase the width of the gap between the opposed bearing surfaces on that side, but providing complete symmetry is maintained this resultant thrust will be balanced by an equal and opposite thrust on the other side of the movable valve member and no transverse displacement of the valve member will occur.

However if particles larger than the gap between the bearing surfaces on one side of the valve member become trapped at the gap entry, this will produce a reduced flow through the gap downstream of the particles and a pressure "shadowing" effect in the gap, or in other words a local hydrostatic pressure reduction in the fluid film within the gap at a location immediately downstream of the obstructing particle or particles, with the result that the hydraulic thrust acting on the valve member on that side will be decreased, although remaining unaltered on the other side. The unbalanced thrust causes the gap on the particle side of the valve member to be decreased and that on the other side to be increased. Under these conditions smaller particles which would otherwise have passed safely through the original gap on the particle side will become trapped at the entry to the narrowed gap, and will themselves set up a pressure "shadowing" effect and further decrease the hydraulic thrust in the gap on that side of the valve member. The effect is thus cumulative and will cease only when the gap at the particle side of the valve member is reduced to zero. When this occurs friction between the valve member and the valve body is sharply increased and a large force is required to move the valve member for valve operation.

According to the present invention in a hydraulic servo valve of the type specified each of the bearing surfaces of the movable valve member is formed with one or more relieved areas extending up to its edge on the high-pressure side of the valve member, leaving a continuous unrelieved band or flange extending around the bearing surface between the relieved area or areas and the low-pressure side of the valve member, the relieved areas defining with the opposed bearing surfaces of the valve body zones of increased clearance whose upstream edges are in direct communication with the high-pressure side of the movable valve member.

Thus particles of a size such as would normally have just been trapped at the gap entry in the case of an unrelieved valve member will now be able to enter the zones of increased clearance and will be trapped instead at the downstream edges of the relieved areas. There will be a pressure "shadowing" effect downstream of the trapped particles which will reduce the hydraulic thrust on the unrelieved band or flange of the associated bearing surfaces, but there will also be a pressure build-up upstream of the trapped particles in the zones of increased clearance, producing a compensating increase in the hydraulic thrust on the relieved area. If the dimensions of the relieved areas are suitably chosen in relation to the other dimensions of the valve, it is possible to produce an increased total hydraulic thrust on the whole bearing surface of the movable valve member as a result of particle trapping at the downstream edge of the relieved area or areas of that bearing surface, and thus to produce an increase in the clearance between that bearing surface and the co-operating bearing surface of the valve body as a result of the particle trapping between them.

Thus with a valve member whose bearing surfaces are relieved in accordance with the invention, the tendency is for the gap width to be increased between the co-operating bearing surfaces between which particle trapping occurs, thus allowing the trapped particles to pass across the unrelieved band of the bearing surface of the valve member to the low-pressure side of the valve.

Moreover this increase in the gap width will produce a substantial change in the hydraulic thrust operating on the corresponding bearing surface of the valve member, by virtue of the distortion of the pressure gradient resulting when the film clearance on that side of the valve member changes. This change in thrust takes place in the stable sense tending to restore the valve member to a centralised position in the overall space available. It can be shown mathematically that for a given mean film thickness there is an optimum depth for the relieved areas, to produce the greatest centralising force on the valve member. It is thus possible to arrive at a compromise solution in the dimensioning of the relieved areas, whereby the valve member will lift away from the co-operating bearing surface of the valve body to flush away contamination due to particle trapping at one side of the valve member, but will be immediately returned to its centralised position when the contamination has been removed.

Preferably the total area of the relieved area or areas of each bearing surface of the movable valve member should be greater than the area of the residual unrelieved portion of the bearing surface.

Each bearing surface of the movable valve member may be formed with continuous annular relieved bands extending along its edge on the high pressure side of the valve member. Alternatively, each bearing surface of the movable valve member may have two or more relieved areas distributed along its edge on the high pressure side of the valve member.

The invention is particularly although not exclusively applicable to the known type of balanced high-pressure hydraulic servo valve in which the valve body includes a pair of opposed platens having spaced parallel ported bearing surfaces, and in which the movable valve member comprises an annular sleeve having parallel end surfaces constituting the bearing surfaces of the sleeve, the sleeve being slidable between the bearing surfaces of the opposed platens in a direction transverse to the sleeve axis to uncover selectively alternative delivery ports in the platen bearing surfaces, so as to place the selected ports in communication with the pressurised central transverse bore of the valve sleeve, and to place the non-selected ports in communication with the low-pressure return region outside the sleeve.

In one application of the invention to this construction of valve, each of the two end faces of the sleeve constituting its bearing and sealing surfaces is formed with a continuous annular relieved band whose radial width extends from the inner peripheral edge of the end face over the greater part of the radial width of the end face, leaving a narrow continuous annular unrelieved band or in other words an outwardly projecting radial rib or flange upstanding around the relieved band. The outer edge of each end face of the valve sleeve may also be formed with a narrow continuous relieved band around the unrelieved band, for the purpose of controlling the base pressure in the associated servo actuator controlled by the valve as will be described in more detail below.

Alternatively, each end face may be formed with a pair of arcuate relieved bands which together extend around the greater part of the inner peripheral edge of the bearing surface leaving a pair of unrelieved pads between adjacent ends of the two relieved bands. In this case the valve sleeve may be formed with a pair of axial cross-bores extending through its wall between the two bearing surfaces at its end faces at diametrically opposite parts of the valve sleeve, the mouths of the cross-bores being in the pads.

Figure 4:
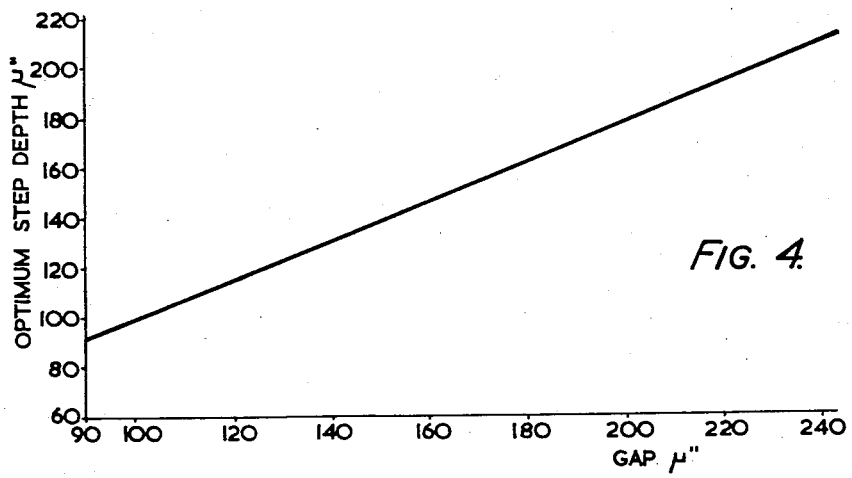
Figure 2:
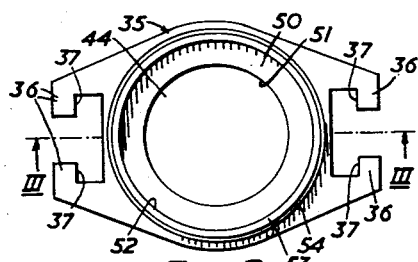
Figure 3:
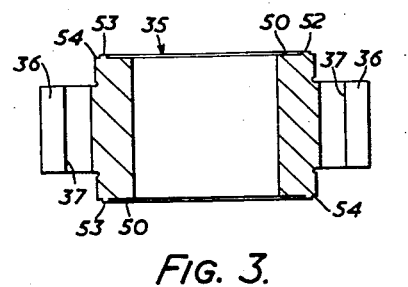
Figure 5:
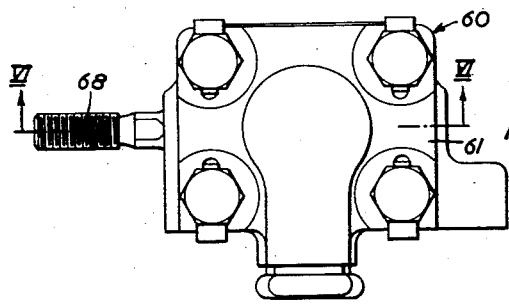
Figure 6:
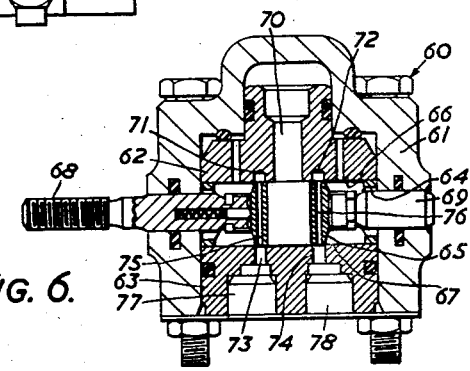
Figure 7:
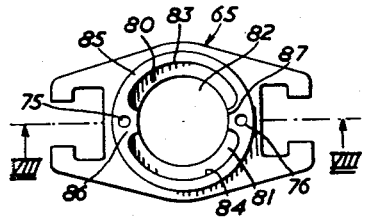
Figure 8:
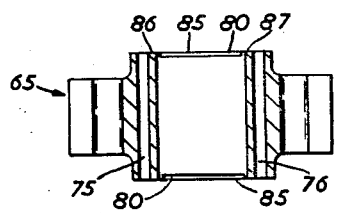

The invention may be carried into practice in various ways but two specific embodiments will now be described with reference to the accompanying drawings, in which:

FIGURE 1 is a cross-sectional view of a 5/32 inch balanced hydraulic slide valve, FIGURE 2 is a view of one end face of the movable valve slide of the valve of FIGURE 1, FIGURE 3 is a section on the line III—III of FIGURE 2, FIGURE 4 is a graph showing the relationship between the nominal gap width between the bearing surfaces of a slide valve and the optimum step depth in each bearing surface of the valve slide, FIGURE 5 is a plan view of a modified form of hydraulic slide valve, FIGURE 6 is a section on the line VI—VI of FIGURE 5, FIGURE 7 is a view of one end face of the movable valve slide of the valve of FIGURES 5 and 6, and FIGURE 8 is a section on the line VIII—VIII of FIGURE 7.

The embodiment illustrated in FIGURES 1 to 3 is a 5/32 inch balanced hydraulic servo valve of the slide type for controlling the supply of pressure fluid to the two ends of a double-acting jack whose inlet ports are connected to delivery passages 11 and 12 formed in the jack body 13 on which the valve 10 is mounted. The valve 10 comprises an outer valve body 14 containing a pair of platens 15 and 16 having opposed parallel plane bearing surfaces 17 and 18 polished to mirror finish to an accuracy of one optical colour band, that is to a standard optical flat, the two platens 15 and 16 being held apart at the desired spacing by a spacing ring 19 whose end surfaces are parallel to within 0.00005 inch and are also finished to a flatness of within one colour band. The platen 15 is formed with a central pressure inlet port 20 communicating via a passage 21 formed in the valve body 14 with the high-pressure inlet 22 of the valve body 14 which in use is connected to a supply of high-pressure hydraulic fluid at say 4000 p.s.i. The platen 15 is provided with alternative delivery ports 23 and 24 spaced apart on either side of the inlet port 20 and communicating through tubular connectors 25 and 26 with delivery passages 27 and 28 in the valve body 14 which lead to the delivery passages 11 and 12 in the jack body 13. Similarly the platen 16 is provided with alternative delivery ports 29 and 30 which communicate through tubular connectors 31 and 32 with the delivery passages 11 and 12 in the jack body 13.

The valve is provided with a movable slide 35 shown in detail in FIGURES 2 and 3. The slide 35 comprises an annular sleeve mounted between the platens 15 and 16 for sliding movement in the direction perpendicular to the sleeve axis and parallel to the parallel lines respectively joining the centres of the delivery ports 23 and 24 of the platen 15 and the delivery ports 29 and 30 of the platen 16, the distance between the centres of the ports 23 and 24 being equal to that between the centres of the ports 29 and 30.

The annular end faces of the valve slide 35 constitute bearing surfaces which co-operate with the bearing surfaces 17 and 18 of the two platens to overlie and close all the delivery ports 23, 24, 29 and 30 when the valve is in its closed position, as shown in FIGURE 1, but to progressively uncover corresponding selected delivery ports in the two platens when the slide is moved in a selected direction from its closed position.

The slide 35 is formed with two pairs of protruding lugs 36 on its outer, generally cylindrical surface at diametrically opposite regions, and each of the lugs 36 is formed with an undercut keyway 37.

The keyways 37 are engaged by the correspondingly formed heads 38 of an operating spindle 39 on a balancing spindle 40. The operating spindle 39 extends through a sealed bore 41 in the valve body 14 for connection outside the valve to external operating mechanism for operating the servo valve. The balancing spindle 40 is aligned with the operating spindle 39 but is disposed in a sealed bore 42 in the valve body 14 situated on the opposite side of the slide 35. Thus the in and out movement of the operating spindle 39 causes the required slide movement of the slide 35 between the platens 15 and 16 to actuate the valve, the balancing spindle 40 serving to maintain the required balance of forces in the system. When the slide 35 is in its centralized position as shown in FIGURE 1, the two annular end faces of the slide 35 co-operate with the delivery ports 23, 24, and 29, 30 of the respective platens 15 and 16 to overlie the delivery ports and to seal them off from the central cylindrical bore 44 of the slide 35 which is in communication with the high pressure inlet port 20. However when the operating spindle 39 is moved in the selected direction, for example towards the right in FIGURE 1, the resultant movement of the slide 35 progressively uncovers the delivery ports 24 and 30 to place them in communication with the central bore 44 of the slide at high pressure, and simultaneously progressively uncovers the other delivery ports 23 and 29 but places them in communication with the annular space 45 between the platens outside the valve slide 35, which is at return pressure and is in communication with a return passage 46 of valve body 14. Thus high-pressure fluid is supplied to the delivery passage 12 of the jack body 13, but the other delivery passage 11 is connected through annular space 45 to the return passage 46. Similarly when the valve operating spindle 39 is moved towards the left in FIGURE 1, the delivery ports 23 and 29 are progressively placed in communication with the central bore 44 of the slide and thus with the high-pressure supply, whilst the delivery ports 24 and 30 are placed in communication with the return passage 46.

In accordance with the invention each annular end surface of the valve slide 35 is formed with a circumferential annular band 50 relieved to a depth of 50 to 60 micro-inches. The relieved band 50 at each end of the slide extends radially outwardly from the inner edge 51 of the end face where it meets the central bore 44 of the sleeve, and terminates in a circumferential outer step 52 so as to leave a relatively narrow upstanding annular band 53 of unrelieved material in the form of a radially projecting flange or rig extending circumferentially around the bearing surface. In this embodiment the overall diameter of each end surface of the sleeve 35 is 0.902 inch, whilst the diameter of the central bore 44 of the sleeve is 0.577 inch. The outer diameter of each relieved band 50 is 0.798 inch, and its radial width is 0.110 inch, leaving an unrelieved band or flange 53 of radial width 0.052 inch. The distance between the faces of the unrelieved bands 53 on the two ends of the sleeve 35, measured parallel to the axis of the central bore 44 of the sleeve, is made slightly less than the corresponding height of the spacing ring 19 which separates the upper and lower platens 15 and 16, so that after allowing for deflection of the platens under the applied hydraulic pressure which urges them inwardly towards one another against the spacing ring, the sleeve 35 has a certain total end float between the opposed bearing surfaces 17 and 18 of the platens.

Thus with the valve in operation and connected to the supply of high-pressure fluid, there will be a continuous steady seepage flow of fluid generally radially outwardly across the relieved annular bands 50 at the two ends of the sleeve 35 and across the unrelieved bands or flanges 53, these fluid streams passing between the sleeve 35 and the bearing surfaces 17 and 18 of the platens and draining into the low-pressure return region 45 outside the sleeve 35. These streams thus provide bearing films of high-pressure fluid for lubricating the sliding movement of the sleeve 35 between the bearing surfaces 17 and 18 of the platens, thus virtually eliminating metal-to-metal contact between the bearing surfaces whilst at the same time producing a strong self-centering action tending to return the slide to its central position between the platen faces 17 and 18 after lifting to clear trapped particles, as described above, and also serving to prevent the valve slide tilting in operation.

It has been found that for a given size of valve and for a given outer diameter of the relieved bands 50, the optimum depth to which the bands 50 are relieved, corresponding to the height of the steps 52, for maximum centralising effect on the slide 35, is not constant but follows an approximately linear relationship with the nominal mean gap width between each of the bearing surfaces 17 and 18 and the opposed surface of the unrelieved band 53 of the slide. This relationship is illustrated diagrammatically in FIGURE 4. Thus for the 5/32 inch valve illustrated in FIGURES 1 to 3, in which the diameter of the step 52 is 0.798 inch, for a gap width of 90 micro-inches the optimum step depth is in the region of 92 micro-inches whilst for a gap width of 180 micro-inches the optimum step depth is in the region of 162 micro-inches. Other values can be derived by interpolation from the graph of FIGURE 4.

In conjunction with the inner relieved bands 50 on the upstream sides of the end faces of the valve slide 35, it is also desirable in many cases to relieve the outer edge of the unrelieved band or flange 53 on each face in order to control more accurately the so-called "base pressure" in the servo actuator or jack controlled by the valve. It is desirable that the static and dynamic base pressures of servo actuators shall be maintained at approximately the same level in order to reduce fatigue effects to a minimum. The outer relieved band, shown at 54 in FIGURES 2 and 3, serves to control accurately the overlap between the valve slide 35 to the two delivery ports when the valve slide is in its centralised position, for the purpose of establishing the "base pressure" in the actuator at a required value, and if carefully designed helps to ensure that the actuator movement is smooth. Thus in the embodiment of FIGURES 1 to 3 the band 54 around the outer periphery of each end face of the valve slide is relieved to an inner diameter of 0.855 inch, the radial width of the outer relieved band 54 being thus approximately 0.023 inch.

In the embodiment illustrated in FIGURES 5 to 8, the valve 60 comprises as before a valve body 61 containing platens 62 and 63 spaced apart by a spacing ring 64, and a valve slide 65 mounted for sliding movement between the bearing surfaces 66 and 67 respectively of the platens 62 and 63, and provided with an actuating spindle 68 and a balancing spindle 69.

In this case however the upper platen 62 is provided with a pressure inlet port 70 communicating with the pressure inlet of the valve body 61 but is not formed with alternative delivery ports as in the preceding embodiment. Instead, the platen 62 is formed with a pair of blind ports 71 and 72 in register with the delivery ports 73 and 74 of the other platen 63 and communicating with the latter through cross bores 75 and 76 formed in the valve slide 65. These blind ports 71 and 72 serve to maintain balanced the hydraulic pressure forces acting on the two sides of the valve slide 65 during operation of the valve, and in conjunction with the cross bores 75 and 76 they serve to increase the total flow through the alternative delivery passages 77 and 78 of the valve by the seepage of fluid across the blind ports 71, 72 and through the cross bores 75 and 76 as the valve is selected.

In this embodiment, each end face of the valve slide 65 is formed, not with a complete annular relieved band on its inner marginal portion as in the preceding embodiment, but with a pair of arcuate relieved bands 80 and 81 extending from the edge of the central cylindrical bore 82 of the valve slide as far as steps 83 and 84, which define the inner edges of the unrelieved annular peripheral radial flanges or bands 85 of the end face. The unrelieved band or flange 85 of the end face merges with inwardly projecting unrelieved pads 86 and 87 formed around the mouths of the cross bores 75 and 76 and between the ends of the relieved arcuate bands 80 and 81.

The function of the relieved bands 80 and 81 in preventing particle trapping by causing the slide 65 to lift from one of the opposed platen bearing surfaces and then to re-centralise itself again after trapped particles have been cleared, is the same as in the preceding embodiment.

In this case however no outer relieved band is provided outside the unrelieved band 85 of each end face of the slide.

The present invention is not to be regarded as limited to servo valves of the type having a movable valve member in the form of a flat annular disc-like sleeve sliding between spaced parallel plane bearing surfaces within the valve body, but it may be applied to other forms of hydraulic servo valve. In particular the invention is applicable to a piston-type valve whose movable valve member is of generally dumb-bell shape having two aligned end portions of cylindrical shape joined by a central neck portion and sliding in a cylindrical bore in the valve body. In this case a relieved annular band would be formed along the inner edge of each cylindrical end portion of the valve piston around the whole or the greater part of its circumference, the relieved portions at each end of the valve piston constituting the major portion of the area of the end portion of the piston.

What we claim as our invention and desire to secure by Letters Patent is:

1. A hydraulic servo valve comprising a valve body, a movable valve member slidably mounted in the valve body, high-pressure and low-pressure regions in the valve body separated from one another by the movable valve member and situated on the high-pressure and low-pressure sides thereof, the valve body being formed with ported bearing surfaces and the movable valve member being formed with bearing surfaces which cooperate with and slidably engage the bearing surfaces of the valve body to support the valve member slidably therein and to provide the required clearance gaps for hydraulic sealing between the high-pressure and low-pressure sides of the valve member, selection of the valve being performed by relative sliding movement of the valve member in the valve body, each said bearing surface of the movable member including a continuous raised flange of uniform width and thickness adjacent its low-pressure side, said flange having a minimum clearance with the cooperating bearing surface of the body and therewith defining a relatively constricted portion of the clearance gap between said bearing surfaces, each said bearing surface of the movable member further including a continuous relieved area of uniform width substantially greater than the width of the flange, said relieved area being contiguous and on the high-pressure side of the flange, said relieved area together with the cooperating bearing surface of the body defining between them a relatively continuous enlarged portion of the clearance gap between the respective bearing surfaces, all of said gap being clear, a film of hydraulic fluid fully occupying said gap, said enlarged gap portion having an upstream edge in open communication throughout its entire extent with said high-pressure region and being supplied with hydraulic fluid from said region.

2. A hydraulic servo valve as claimed in claim 1 in which the total relieved area of each bearing surface of the movable valve member is greater than the peripheral surface area of its said flange.

3. A hydraulic servo valve as defined in claim 1 in which said relieved area and its associated flange of each bearing surface of the movable member are both of annular configuration about a common axis.

4. A hydraulic servo valve comprising a valve body, a movable valve member slidably mounted in the valve body, high-pressure and low-pressure regions in the valve body separated from one another by the movable valve member and situated on the high-pressure and low-pressure sides thereof, the valve body being formed with ported bearing surfaces and the movable valve member being formed with bearing surfaces which cooperate with and slidably engage the bearing surfaces of the valve body to support the valve member slidably therein and to provide the required clearance gaps for hydraulic sealing between the high-pressure and low-pressure sides of the valve member, selection of the valve being performed by relative sliding movement of the valve member in the valve body, and in which each of the bearing surfaces of the movable valve member is formed with at least one relieved area extending up to its edge on the high-pressure side of the valve member, leaving a continuous unrelieved band extending around the bearing surface between the relieved area and the low-pressure side of the valve member, the relieved areas of the bearing surfaces defining with the opposed bearing surfaces of the valve body zones of increased clearance having upstream edges in direct communication with the high-pressure region of the valve body, said valve body including a pair of opposed platens having spaced parallel ported bearing surfaces, and in which the movable valve member comprises an annular sleeve having a central transverse bore and having spaced parallel end surfaces constituting the bearing surfaces of the sleeve, the sleeve being slidable between the bearing surfaces of the opposed platens in a direction transverse to the sleeve axis to uncover selectively alternative delivery ports in the platen bearing surfaces and to place the selected ports in communication with the central transverse bore of the valve sleeve, and to place the non-selected ports in communication with the low-pressure return region outside the sleeve.

5. A hydraulic servo valve as defined in claim 4 in which the said relieved area on each said bearing surface of the sleeve comprises a continuous annular relieved band whose radial width extends from the inner periphery of the end face, leaving said unrelieved band as a narrow continuous annular flange upstanding around the relieved band.

6. A hydraulic servo valve as claimed in claim 5 in which the outer edge of each end face of the valve sleeve is also formed with a narrow continuous relieved band around the unrelieved band.

7. A hydraulic servo valve as claimed in claim 4 in which each end face of the valve sleeve is formed with a pair of arcuate relieved bands which together extend around the greater part of the inner peripheral edge of the bearing surface leaving a pair of unrelieved pads between adjacent ends of the two relieved bands.

8. A hydraulic servo valve as claimed in claim 7 in which the valve sleeve is formed with a pair of axial cross bores extending through its wall between the two bearing surfaces at its end faces at diametrically opposite parts of the valve sleeve, the mouths of the cross bores being in the unrelieved pads.

References Cited in the file of this patent

UNITED STATES PATENTS

| | | |
|---|---|---|
| 1,204,666 | Kern | Nov. 14, 1916 |
| 1,967,851 | Wilson | July 24, 1934 |
| 2,212,955 | Price et al. | Aug. 27, 1940 |